United States Patent [19]

Andriewsky

[11] Patent Number: 4,708,217

[45] Date of Patent: Nov. 24, 1987

[54] EXTENSILE BEAMS FOR FLAT-SHAPED WEIGHING-MACHINES

[76] Inventor: Miguel S. Andriewsky, Sucre 3601, (1430) Capital Federal, Argentina

[21] Appl. No.: 870,780

[22] Filed: Jun. 5, 1986

[30] Foreign Application Priority Data

Jun. 21, 1985 [AR] Argentina .................. 300769

[51] Int. Cl.$^4$ .................. G01G 3/14; G01L 1/22
[52] U.S. Cl. .................. 177/211; 73/862.65
[58] Field of Search .................. 177/211; 73/862.65

[56] References Cited

U.S. PATENT DOCUMENTS 4,361,199 11/1982 Ulicny .
4,611,678 9/1986 Andriewsky .................. 177/211

FOREIGN PATENT DOCUMENTS 2847499 5/1980 Fed. Rep. of Germany .

Primary Examiner—George H. Miller, Jr.
Attorney, Agent, or Firm—Ladas & Parry

[57] ABSTRACT

Extensile beam structures, devoid of profiles having vertical flanges, are provided for a flat weighing-machine. Each beam structure features a pair of longitudinally aligned and separated tongue-plates, bridged by an overlying thin bridge-sheet parallel to and vertically offset from the tongue-plates. Each tongue-plate has an orifice connected to supports, which load the beam structure to cause bending thereof. The bridge-sheet is reinforced for rigidity along most of its length, except for a middle zone thereof where strain-gauges are attached and where flexibility is further enhanced by recesses cutting into the width thereof. Wider anchor-plates having bent ends are fixed to the overlapping parts of the bridge-sheet and the pair of tongue-plates, and vertically corresponding ends of the anchor-plates are joined by respective thin strip-plates that articulate each tongue-plate about the bridge-sheet, thereby conveying extensibility to the beam structure, to eliminate hysteresis and assist in reducing angle and moment errors.

9 Claims, 5 Drawing Figures

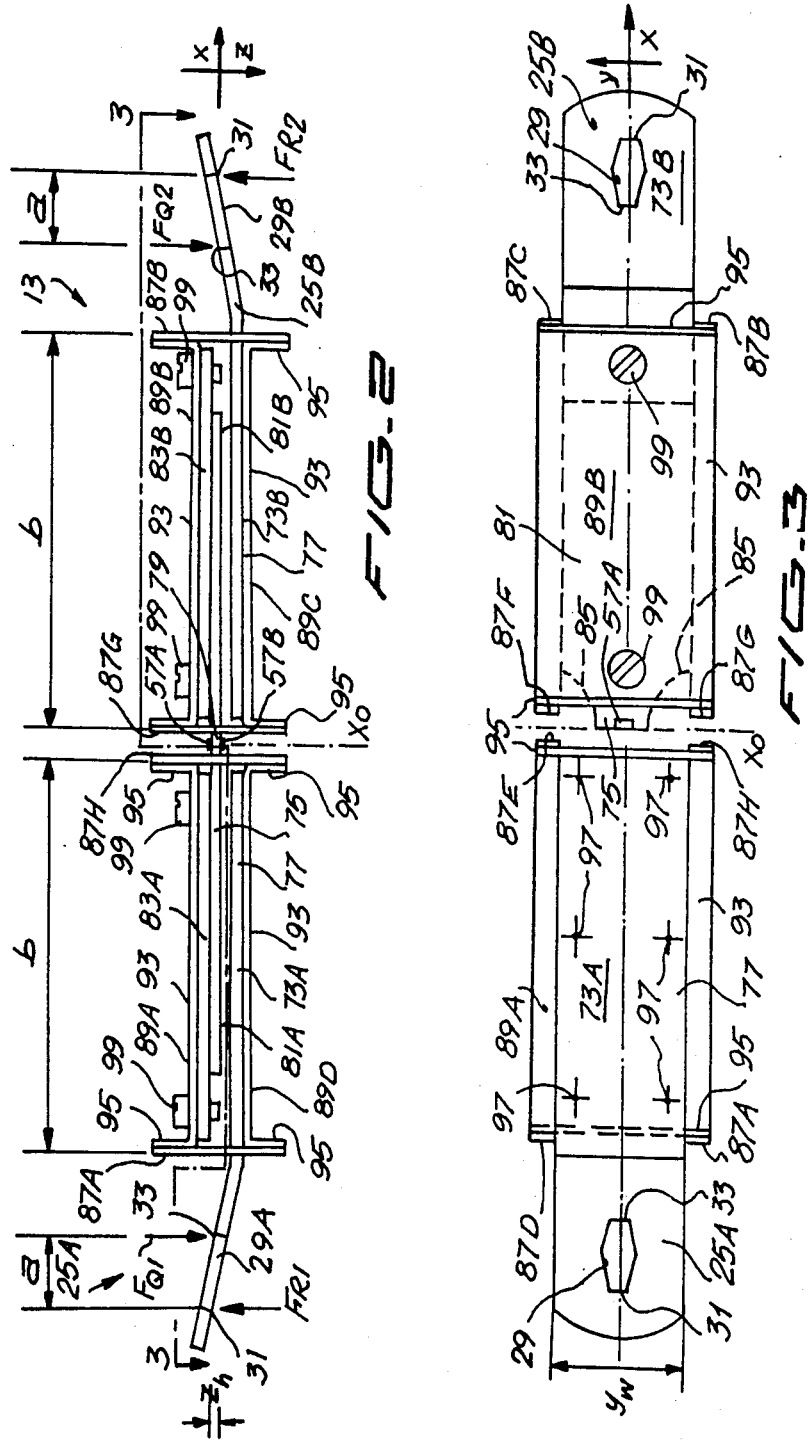

EXTENSILE BEAMS FOR FLAT-SHAPED WEIGHING-MACHINES

FIELD OF THE INVENTION

The present invention is related with automatic weighing-machines and, particularly, to the bending beams forming part thereof, the structure of which has the virture of neutralizing the effects of undesired horizontal forces.

Because weight, by nature and definition, is a variable indicative of an essentially vertical vectorial magnitude, horizontal components of forces applied to the beam threaten to introduce reading errors if they are not adequately neutralized. These errors, which I have identified as "Bending Moment Error" and "Angle Error" are due to vertically offset horizontal forces generating error moments and deformation of beam geometry under load distorting the load/output transfer function, respectively. Horizontal forces generally have at least one, usually two, of the following components: (a) verticality deviations of the beam and platform supports which result in the forces transmitted to the beams resolving into respective pairs of (useful) vertical and (undesirable) horizontal components; (b) friction forces generated when the beam bends under load, due to the "scraping" movement between each beam and the supports in contact therewith; and (c) elastic forces produced by small elastic deformations of the mobile supports when accommodating longitudinal movement of the bending beam. Since friction force components are also responsible for hysteresis, it is desirable that work asssociated with loaded beam deformation be stored as (elastic) potential energy, rather than dissipated through friction. These concepts are discussed at length in my U.S. patent application Ser. No. 701,937, filed Feb. 15, 1985, now U.S. Pat. No. 4,650,016, and furthermore, together with the concept of longitudinally elastic (i.e. extensile beams), in my U.S. patent application Ser. No. 718,933, filed Apr. 2, 1985, now U.S. Pat. No. 4,611,678, both incorporated herein by reference and to which attention is directed.

DESCRIPTION OF THE PRIOR ART

My cited U.S. patent application Ser. No. 701,937 discloses vertically elastic beams linked to mobile supports which, under varying load conditions, yield in an arc to minimize the cause of the cited friction forces and the hysteresis resulting therefrom. The beam geometry features V-shaped ends to minimize the influence of beam deformation on the transfer function and to align the horizontal (i.e. longitudinal) forces to reduce error moment components.

My later U.S. application Ser. No. 718,933 teaches, on the contrary, the use of rigid (fixed) supports, which are necessary under heavy loads for an engineering reason, in combination with longitudinally extendible compound beams in big weighing-machines (for weighing 400 lbs, nearly 200 kg, or more). This neutralizes the effect of the horizontal forces and eliminates urging longitudinal movement between the bending beam ends, so that rigid supports may be used without causing hysteresis, since the forementioned elastic forces are confined to the beam itself and, hence, are not transmitted to the supports.

In the embodiment suitable for larger weighingmachines disclosed in my U.S. application Ser. No. 718,933, the beams are composite in structure, comprising a pair of longitudinally elongated rigid half-beam members overlapping each other at the beam middle portion. Each half-beam member has a respective beam end portion, preferably in the form of a V-shaped endplate, fixed to its rigid member. The two rigid members are interconnected by one pair of longitudinally spaced zig-zagged link-plates, which cause them to move integrally with each other in the vertical direction when subjected to vertical forces (i.e. weight), but allowing freedom of relative movement in the horizontal longitudinal direction. This freedom of movement permits the pair of rigid half-beam members to "slide" along each other under the effect of horizontal forces, to absorb the work (stored as elastic potential energy) of the horizontal forces and avoid them generating detectable error strains in the beams. Furthermore, this "sliding" motion between the pair of rigid members causes the effect of increasing the arcuate length of the beam when the curvature of the middle portion increases with deflection, to compensate for the two end portions keeping their original longitudinal coordinate. Strain-gauges are operatively attached at two longitudinally separated sensing coordinates, located one on each end-plate and equidistant from the beam's middle cross-section which is a bending moment invariant coordinate, in a manner to provide an output signal independent of load eccentricity.

SUMMARY OF THE INVENTION

An object of the present invention is to provide electronic automatic weighing-machines of small and intermediate sizes, provided with fixed supports and longitudinally extensile beams. In spite of that this object may seem to go against the tendency shown by my forementioned U.S. application Ser. No. 701,937, the experience accumulated through my later work leads me to apply the concept of combining extensile beams with fixed supports in smaller weighing-machines, in relation to the machine disclosed in the U.S. application Ser. No. 718,933.

Hence, according to a feature of the present invention, the combination of extensile beams and fixed supports is suggested for smaller scales, such as 10" (about 250 mm) long (beam length) for weighing loads of 30 lbs (about 15 kg). However, in some cases where flat-shaped scales are specified, it is highly impractical to simply redimension the structure shown in the U.S. application Ser. No. 718,933, particularly because the T-section profiles which reinforce the middle portion of the beam have their web arranged in the vertical plane, which may result in a weighing-machine of excessively height in such cases.

Thus, it is another object of the present invention to provide electronic automatic weighing-machines featuring the previously stated combination, and considerably flattened in the vertical direction (i.e. height), to permit hosuing and/or use in shallow spaces.

Another object of the present invention is to provide a flatter extensile beam for use in such small and intermediate-size weighing-machines.

These and other objects are attained with the beam structure of the present invention, wherein each compound extensile beam structure comprises two aligned rigid halfbeam members bridged by a flexible thin elongated middle sheet-plate (or bridge-sheet). The latter carries the strain-gauges which are located across the invariant beam middle coordinate; the bridge-sheet is also separately articulated with both the rigid half-beam members by separate pairs of links, in a way that allows relative movement in the longitudinal direction (i.e. sliding) while substantially integrating movement in the vertical direction. Each beam has opposite end-portions fixed to or lumped into a corresponding half-beam member.

The thin bridge sheet has a central zone crossing the beam's plane of symmetry, which bends in response to the application of a load, and two end zones (longitudinally opposed by the central zone), preferably rigid, to which the pairs of links are connected. The half-beam members comprise a pair of tongue-plates extending in opposite directions along a horizontal plane parallel to and spaced from the plane of the bridge sheet. The links preferably comprise pairs of strip-plates which interconnect the tongues with the bridge-sheet, the interconnecting linkage strips being adequately flexible to allow both tongues to longitudinally slide with respect to the bridge-sheet. Functionally, the tongues receive and transmit bending moments originated by the weight of a load, the flexible interconnections convey the extensibility virtue to the beam which neutralizes the effect of the horizontal forces on the detected bending moment and at the same time permits the conversion of the vertical forces into useful bending moments, and the flexible bridge-sheet deforms elastically at its middle point so as to develop mechanical strains in its outer fibres which are detected through adequate means, preferably a pair of strain-gauges fixed to the pair of top- and under-faces of the sheet.

As a result of this invention, and in contrast to the disclosure of the U.S. application Ser. No. 718,933, a flatter beam is obtained, symmetrical in relation to the transverse middle plane of the beam located at said invariant coordinate, and the deflection of the beam in the middle point thereof is detected in the bridge-sheet, which is thinner than the tongues concerned with receiving and transmitting the load forces and their corresponding reactions which generate the detectable bending moment. These advantages are at the expense of a greater quantity of beam component parts.

Preferably, the section-modulus of the section of the bridge-sheet, where it crosses the symmetry plane containing the invariant coordinate, may be further reduced by a pair of recesses on each side which enhance beam flexure at this point, and consequently improve the resolution of the weighing-machine, in terms of mechanical strain.

BRIEF DESCRIPTION OF THE DRAWINGS

FIG. 2 shows a side view of just one of the symmetrical beam of the weighing-machine of FIG. 1, according to the present invention.

FIG. 3 shows a partial horizontal cross-section and top view of the beam, according to line 3—3 of FIG. 2.

DETAILED DESCRIPTION OF THE DRAWINGS

Figure 1:
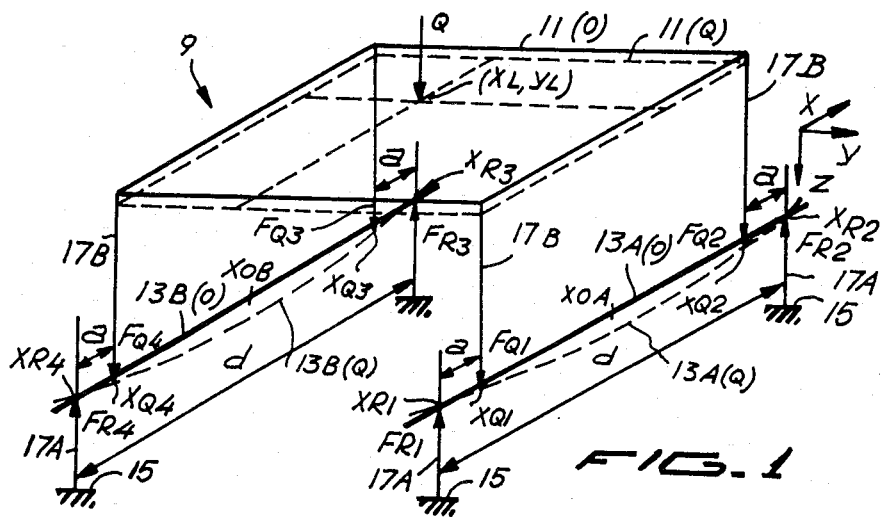
FIG. 1 is a tri-dimensional functional schematic of a weighing-machine viewed in perspective, of the type addressed by the present invention, shown in full lines when in an unloaded state, and in dashed lines when in a finite (i.e. non-zero) load state.

Beginning with FIG. 1 of the drawings, a weighing-machine 9 is shown schematically, including a platform or tray 11, which may move vertically from generally unloaded position indicated by a reference symbol 11(O) to a more loaded position 11(Q). A force $\overline{Q}$ represents the weight or force exerted by a load at a coordinate point $(X_L, Y_L)$ of the platform 11. Coordinate $(X_L, Y_L)$ could well be located anywhere along tray 11, and in general there will be a multiplicity of forces $\overline{Q}$ distributed on tray 11; however, their effect on the overall weight measurement is simply the summation of their individual effects. Platform 11 is suitably coupled to a pair of horizontal extensile bending beams 13A, 13B to apply four vertical forces $\overline{F}_{Q1}$, $\overline{F}_{Q2}$, $\overline{F}_{Q3}$, $\overline{F}_{Q4}$ at the application or coupling coordinates $X_{Q1}$, $X_{Q2}$, $X_{Q3}$, $X_{Q4}$, respectively. In turn, beams 13A, 13B have four coupling coordinates $X_{R1}$, $X_{R2}$, $X_{R3}$, $X_{R4}$ resting on a base or frame 15 (not illustrated in detail), to which it is coupled and supported thereby. This resting or supporting action is indicated by reactions $\overline{F}_{R1}$, $\overline{F}_{R2}$, $\overline{F}_{R3}$, $\overline{F}_{R4}$, which respond to load forces $\overline{F}_{Q1}$, $\overline{F}_{Q2}$, $\overline{F}_{Q3}$, $\overline{F}_{Q4}$. The reference numerals 17A, 17B indicate the location of coupling means (not illustrated in detail) which respectively transmit the load forces and reactions $\overline{F}$ to the beams 13. The coupling rest coordinates $X_R$ on each beam 13 (when generalizing, the subscripts A, B, etc. or 1, 2, etc. are implicit in the reference numerals, e.g. beam 13 refers to either of beams 13A, 13B and beams 13 refers to both beams 13A, 13B, etc.) are spaced apart by a distance d. Rest coordinate $X_{R1}$ is separated from supporting point $X_{Q1}$ by distance a, whilst coordinates $X_{R2}$, $X_{R3}$, $X_{R4}$ are likewise separated respectively from coordinates $X_{Q2}$, $X_{Q3}$, $X_{Q4}$ by equal distances a. It can be shown that at a middle coordinate $X_O$ of beam 13, from which rest coordinates $X_R$ are equidistant (and obviously application coordinates $X_Q$ likewise), the bending movement $M_O$ is:

$$M_O = \tfrac{1}{2}(F_{Q1} + F_{Q2})\,a$$

which is independent of the relative longitudinal position $X_L$ of the load $\overline{Q}$ on platform 11, for which reason the middle coordinate $X_O$ is also known as the invariant coordinate. As described in detail further on, strain-gauges 57 are coupled to the beams 13, in a way to detect the longitudinal elongation, resulting from the bending moment $M_O$, precisely at their respective middle or invariant coordinate $X_O$.

The beam of the present invention is described now with particularly reference to FIGS. 2 and 3. These figures show a beam 13 for a weighing-machine 9 having the combination of extensile beams 13 and relatively rigid couplers 17; adequate for smaller weighing-machines 9 in relation to that of the U.S. application Ser. No. 718,933, such as a weighing-machine 9 destined for 30 lbs (about 15 kg) loads and needing a beam span of (d=) 10" (about 250 mm). For this smaller type of weighing-machine 9, it is somewhat inpractical to simply redimension the structure of the beam illustrated in the U.S. application Ser. No. 718,933, because the T-section profiles that strengthen the beam middle portion have each their web standing in a vertical plane, resulting in an excessive tall weighingmachine. On the other hand, the beam 13 illustrated in FIGS. 2 and 3 is substantially flatter in the vertical direction z, at the expense of an increase in the number of its component parts, and is thought for use in a weighingmachine 9 of small height.

Each beam 13 has a pair of end-portions 25A, 25B which may feature certain inclination with respect to the horizontal plane xy, in spite that this is not indispensible but is certainly a desirable feature of this invention. Each end portion 25 features a through orifice 29 which defines a pair of opposite edges 31, 33 which are horizontally transversal to the longitudinal direction x of the beam 13. Each end-portion 25 is supported on the frame 15 of the weighing-machine 9 by the outer edges 31 resting on a set of coupling supports 17A; whilst it is linked by the internal edges 33 to another set of couplers 17B which support the load platform 11. The end-portions 25 act as load and reactive force receivers to develop bending moments M which are then detected by means of a pair 57 of strain-gauges 57A, 57B operatively connected to the beam 13.

The beam 13 in FIG. 2 may be considered as split into two congruent half-beam members including respective elongated tongue-plates 73A, 73B bridged by an elongated thin sheet-plate member 75 made of SAE 1070 steel. In each half-beam tongue-plate 73A, 73B there may be defined one respective beam end-portion 25 projecting longitudinally outwards and having means 29, 31, 33 for receiving the load and reactive forces $\overline{F}_Q$, $\overline{F}_R$, from the rigid couplers 17 (not shown in detail herein), and an inner portion 77 extending inwardly towards the middle section $X_O$ (i.e. the symmetry plane) of the beam 13.

Unlike the structure disclosed in my U.S. application Ser. No. 718,933, this embodiment of the beam 13 of the present invention suggests that the strain-gauges 57A, 57B be located exactly across the middle plane $X_O$ of the beam 13, precisely at a middle zone 29. The middle zone 79 is defined about the plane of symmetry $X_O$, equidistant from the edges 31 (and also from the edges 33), such that the configuration of the beam 13 to one side of the plane $X_O$ is the mirror image of that of the other side, differing also in this manner from the embodiment illustrated in the U.S. application Ser. No. 718,933.

A pair of outer zones 81A, 81B may be defined on the sheet 75, longitudinally flanking the middle zone 79 holding the strain-gauges 57. The sheet 75 is most flexible at its middle zone 79, whilst these outer zones 81 are made rigid against vertical forces $\overline{F}$ by respective reinforcement plates 83A, 83B. The tongue-plates 73 and the reinforcement plates 83 are made of SAE 1010 steel and are each 1¼" (about 30 mm) wide and ⅛" (about 3 mm) thick, which is sufficiently thick to be quite inflexible, insofar the load magnitudes in consideration. The reinforcements 83 do not extend to the middle zone 79 of the bridge sheet 51 where the straingauges 57 are, and since the thickness of the bridge sheet 75 is only about 1/32" (about 1 mm), the flexibility of this middle zone 79 is substantially great; which flexibility may be enhanced by a pair of recesses 85 cut out to reduce the effective width $y_w$ of the bridge sheet 75. In this manner, the transversal section of the bridge sheet 75 at this point $X_O$ is reduced and its flexibility increased according to the function $$\sigma = \frac{M_O}{W_O} = \frac{M_O}{y_{wo} \cdot z_h/6}$$

where $\sigma$ is the bending strain on each outermost fibre of sheet 75, and $W_O$ is the section-modulus and $y_{wo}$ and $z_h$ the width and height respectively of the beam 13, at its middlemost section $X_O$.

The reinforced members 75-83 are located above the inner portion 77 of the pair of tongue-plates 73, and interconnected therewith by means of mobile linkplates comprised by two sets of four metal strips 87A, 87B... 87H and four strip-anchors 89A, 89B, 89C, 89D. The strip-plates 87 are arranged in pairs 87A-87H, ... 87D-87E, forming the opposite sides of rectangles 91A, 91B (FIGS. 4). The anchorplates 89 are made of SAE 1010 steel, 1/32" (about 1 mm) thick and 1½" (about 40 mm) wide, i.e. ¼" (about 5 mm) wider on each side than the plates 73, 83, so that they project width-wise from the tongues 73 and reinforcements 83, as may be clearly seen in FIG. 3. Furthermore, the anchor-plates 89 are bent into a longitudinal U-shape profile having a long web 93 and relatively short flanges 95. Two of the plates 89A, 89B are arranged over the reinforcements 83 and the other two remaining plates 89C, 89D below the tongues 73, as is clearly illustrated in the FIG. 1. The lower strip anchors 89C, 89D are fixed to the inner portion 77 of the bottom face of each tongue-plate 73 by welded spots 97. In spite of that the upper strip anchors 89A, 89B could also be spot-welded to the upper face of the reinforcements 83, it is preferred to use screws 99 to integrate three pieces: one upper strip-anchor 89, one reinforcement plate 83 and one outer zone 81 of the bridge sheet 75. This feature allows for the bridge sheet 75 with the strain-gauges 57 to be assembled last during assembly of the beam 13, to facilitate efficient adjustment.

The strips 87 are of SAE 1090 steel and are only ½ mm thick, to be very flexible. They are oriented in a vertical position in a plane transversal to the longitudinal axis x, and interconnect the tongue plates 73 with the reinforced plate 75-83 to convey to the entire beam 13 (except, of course, in the middle flexure zone 79) the combined features of rigidness in the vertical direction z and extensibility in the longitudinal direction x. These features are schematically visible in FIGS. 4A and 4B, which illustrate different beam configurations and the relative positions of the (reinforced) bridge plate 75, the tongue plates 73 and the strips 87 for two different load states.

The interconnection 87-89 conveys only one degree of freedom of relative movement between the tongue-plate pair 73 and the bridge-sheet 75 and, fundamentally, between the two tongue-plates 73A, 73B themselves, restricted to the longitudinal direction x, thus conveying longitudinal extensibility to the beam 13 as a function of the magnitude and distribution (or eccentricity) of the load $\overline{Q}$. It may be appreciated that this interconnecting mechanism 87-89 conveys the longitudinal displacement freedom because of the articulation provided by the eight strips 87 on the four strip-anchors 89. The flexibility of the linkage strips 87 is what conveys a low elasticity coefficient k to the compound beam structure 13, and makes them extensile in accordance with the present invention.

Figure 4A:
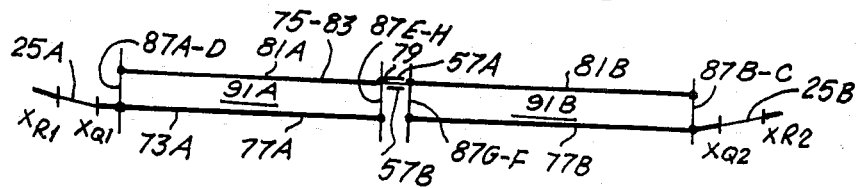
FIG. 4A and 4B rather schematically ilustrate respective geometric shapes of the shallow beam of FIG. 2 for different load states.
Figure 4B:
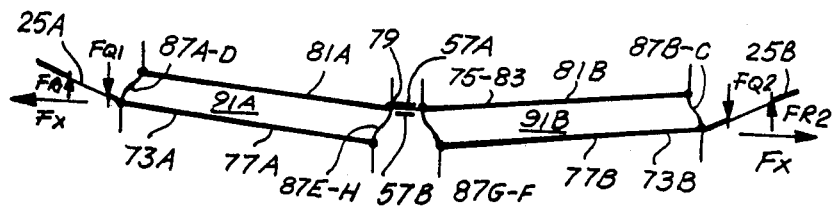

The FIG. 4A is a schematic of the beam 13 in a state of nominal load, whilst the FIG. 4B is similar, but for a state associated with greater load. Because the schematic of FIG. 4B corresponds to a state of greater flexure, it is necessary for the arcuate length of the beam 13 to increase, so that the receiving edges 31, 33 maintain their vertical position $X_Q$, $X_R$ along the x-axis, due to that they are coupled to rigid members 17 (unillustrated herein) as mentioned beforehand. The increase in the arcuate beam length is a result of the mechanical deformation of the strips 87, the elasticity of which is due to their thinness.

In the case schematically shown in FIG. 4B, the longitudinal forces $\overline{F}_X$ are placing the beam 13 under tensile strain. Evidently, when the longitudinal forces $\overline{F}_X$ act in the opposite direction, the beam 13 will suffer compresive strain, and the strips 87 will bend the other way. This extensibility feature of the beam 13 not only compensates factors derived from load variation, but also others such as thermal expansion. As noted, the two half-beam members 73A, 73B may move independently of each other in the longitudinal x-direction, but must move together in the vertical z-direction. This longitudinal arcuate expansion and contraction of the beam 13, when the load Q on the plate 11 changes, eliminates hysteresis.

In actual fact, from FIGS. 4A and 4B, it can be seen that there is a small relative movement in the vertical direction (since the beam 13 deforms in an arc), however it has been found that this does not affect the weight measurement, because the links 87 completely transmit (rather than absorb) the bending moment M due to the vertical forces $\overline{F}_Z$, i.e. the useful forces indicative of the load magnitude Q. It can be seen that the stress applied by the bending moment M on the links 87 is very reduced, for which reason the plates 87 may be extremely thin, e.g. ½ mm, to contribute to their flexibility in the longitudinal x-direction; whilst the tongue plates 73 must be thicker, e.g. about ⅛" (around 3 mm), to efficiently support the load $\overline{Q}$. For a given load force $\overline{F}$ on a beam 13, the bending moment M at each end portion is F.a, and the force f acting on each strip-plate 87 is given by the expression $$f = F \cdot a/b;$$

where a is the lever-arm distance between the edges 31–33 and b the lever-arm distance between pairs of strips 87A-87H=87B-87G=87C-87F=87D-87E. By virtue of this equation, the relatively long length b of each half-beam inner portion 77 causes the effect of the load Q on the strips 87 to be reduced by the factor a/b, for which reason these strips 87 may be so thin and flexible.

Hence, the elastic compound beam structure 13 may support far heavier loads $\overline{Q}$ without collapsing, as a result of this reduction factor a/b. Here again, as in the U.S. application Ser. No. 718,933, this is the key that allows thin linkage strips 87 to be used in substitution for yieldable couplers (e.g. those disclosed in my forementioned patent application Ser. No. 701,937), specifically avoiding friction forces and replacing them with elasticity forces. The elasticity coefficient k associated with the x-axis is now a property of the compound beam 13. In practice, it is generally easier to reduce the magnitude of the horizontal forces $\overline{F}_X$, since k is a function of the beam geometry, whilst the friction coefficient $\mu$ depends on the type of materials rubbing each other. Furthermore, as a result of elasticity components dominating over friction components, the weight measurement is not subjected to hysteresis.

Although the essential features of the invention have been brought out by means of a preferred embodiment, the invention is not limited to this embodiment and, on the contrary, extends to all alternative forms within the purview of the appended claims.

I claim:

1. In a dynamometer machine for detecting the force magnitude of a load applied thereto, and including a pair of longitudinally elongated beam structure that bend under the effect of said load, each beam structure comprising:

two longitudinally moveable half-beam members, each of which has a respective end-portion for generating bending moments in said beam structure in response to said load, interconnecting linkage means which in combination with said two half-beam members form a longitudinally elastic beam structure having an arcuate length which may vary to compensate the bending thereof under said load, and means for measuring a parameter related to the bending moments in transverse sections of said beam structure and deriving said force magnitude therefrom; the improvement whereby:

each beam structure is longitudinally symmetrical about a transverse middle plane, and both half-beam members are coplanarly aligned with each other on opposite sides of said middle plane and adapted to receive forces derived from said load;

each beam structure further including a bridge member parallel to and vertically offset from both half-beam members, said bridge member comprising a flexible middle zone bridging said middle plane and two rigid outer zones connected respectively to the two half-beam via said linkage means;

said linkage means comprising a plurality of strip plates connecting in articulated form each outer zone with respective ones of said half-beam members in a manner substantially defining two rectangles; and said detector means comprise mechanical deformation indicator means coupled to said middle zone of the bridge sheet.

2. The machine of claim 1, wherein said dynamometer machine is a weighing-machine, and said force magnitude is weight.

3. The machine of claim 2, wherein said bridge member comprises:

a thin elongated sheet, and a pair of reinforcement means fixed along said sheet and defining said outer zones thereof.

4. The machine of claim 3, wherein each of said half-beam members comprises an elongated tongue-plate having:

an inner portion having said reinforcement means fixed therealong, and an end portion adapted to receive said forces derived from the load.

5. The machine of claim 4, wherein the longitudinal cross-section of each of said end portions is inclined so that load and reactive forces derived from the weight of said load are applied to each beam structure at substantially the same horizontal level.

6. The machine of claim 5, wherein the longitudinal cross-section of each of said end portions is shaped so that load and reactive forces derived from the weight of said load are applied to each beam substantially on a single plane containing the neutral axis of the beam.

7. The machine of claim 4, wherein said first and second reinforcement means include first and second pairs of strip anchors respectively, each of said strip anchors formed by a small plate transversally bent into a U having a large web and short flanges, the flanges of said first strip anhchors being connected with the corresponding flanges of said second strip anchors by said strip plates arranged in a substantially vertical position and fixed thereto, and said outer zones of the sheet are each fixed to the web of said first strip anchors, and said inner portions of each tongue-plate are each fixed to the web of the second strip anchors.

8. The machine of claim 7, wherein said sheet is fixed by screws to the pair of second strip-anchors, to enable the sheet to be assembled last.

9. An extensile beam (13) having a transversal plane of symmetry ($X_O$), and comprising: a pair of substantially coplanar elongated tongue-plates (73A, 73B), arranged symmetrically relative to (a) the plane of symmetry ($X_O$) of the beam (13) and extending ina longitudinal direction (x) perpendicular to said plane of symmetry ($X_O$), each tongue-plate (73A, 73B) having an end-portion (25a, 25B) adapted to generate bending moments (M) in the beam (13), and an inner portion (77) for transmitting said bending moments (M); first anchorage means (95 of 89C, 89D) located at both ends of each inner portion (77); and elongated bridge-sheet (75) extending across said plane of symmetry ($X_O$) along a plane substantially parallel to and spaced from the plane of said tongue-plates (73A, 73B), and including a flexible middle zone (79) for generating detectable surface strains (o) therein in response to said bending moments (M), and a pair of outer zones (81A, 81B); reinforcement means (83A, 83B) rigidizing the length of each of said outer zones (81A, 81B); second anchorage means (95 of 89A, 89B) located at both ends of each of said outer zones (81A, 81B); and linkage means (87) for interconnecting said bridge-sheet (75) with said tongue plates (73A, 73B) in a manner integrating transversal movement therebetween whilst conveying relative freedom of longitudinal movement therebetween, said linkage means comprising respective transversal flexible stripplates (87A–H) connected vertically between said first and second anchorage means (95).

* * * * *